United States Patent [19]

Uffner et al.

[11] 4,138,385

[45] Feb. 6, 1979

[54] SUBSTITUTED ACETYLACETONATE COBALTIC PROMOTERS FOR UNSATURATED POLYESTER RESIN

[75] Inventors: Melville W. Uffner, Glen Mills; Donald E. Jefferson, Unionville; Charles G. Coe, Aston; Burton D. Beitchman, Springfield, all of Pa.

[73] Assignee: Air Products and Chemicals, Inc., Allentown, Pa.

[21] Appl. No.: 830,182

[22] Filed: Sep. 2, 1977

[51] Int. Cl.$^2$ .................... C08L 67/00; C08L 67/06
[52] U.S. Cl. .................... 260/40 R; 252/431 R; 252/431 N; 252/431 C; 260/340.6; 260/439 R; 260/863; 260/864; 260/865; 260/866; 260/873
[58] Field of Search ............ 260/862, 863, 865, 40 R, 260/873, 439 R, 340.6, 439 C; 252/431 R, 431 N, 431 C

[56] References Cited

U.S. PATENT DOCUMENTS

| | | | |
|---|---|---|---|
| 3,917,730 | 11/1975 | Tkatchenko | 260/431 C X |
| 3,927,056 | 12/1975 | Gosser | 260/431 N X |
| 3,954,664 | 5/1976 | Napier et al. | 260/431 N X |
| 3,962,189 | 6/1976 | Russin et al. | 260/75 R |
| 3,980,583 | 9/1976 | Mitchell et al. | 260/430 |
| 3,988,290 | 10/1976 | Uffner | 260/40 R |
| 4,029,865 | 6/1977 | Vargiu et al. | 260/431 C X |
| 4,072,631 | 2/1978 | Vogt et al. | 260/431 R |

Primary Examiner—Thomas De Benedictis, Sr.
Attorney, Agent, or Firm—Russell L. Brewer; Barry Moyerman

[57] ABSTRACT

This invention relates to an improvement in a process for curing unsaturated polyester resins, preferably chemically thickened with a Group II metal oxide or hydroxide, and to the resulting product. The improvement resides in the use of an acetylacetonate ligand of cobalt III, which is mono, di, or tri-substituted with an electron withdrawing group, e.g. a nitro, phenyl or halogen atom.

20 Claims, No Drawings

SUBSTITUTED ACETYLACETONATE COBALTIC PROMOTERS FOR UNSATURATED POLYESTER RESIN

BACKGROUND OF THE INVENTION

1. Field of the Invention

Unsaturated polyester molding compounds have been known and widely used in the industry for several decades. The origin of sheet molding compound (SMC) and bulk molding compound (BMC), which is an unsaturated polyester resin thickened, generally chemically, has a more recent beginning. Credit seems to be given to Vincent Frilette and Charles F. Fish for the development of chemical thickeners that would permit the manufacture of reinforced and unreinforced molding compositions comprising an unsaturated polyester resin and a vinyl monomer which could be mixed, handled, and stored prior to molding. This development gave wide latitude to compounders and molders of unsaturated polyester resin. It now became possible to compound large batches of a molding composition and store it in a form such as in sheet or in bulk for use at a later time. Prior to this development, it was difficult to obtain tack free compounds and to avoid resin rich molding. Resin rich molding occurs with nonthickened compounds in that the polyester resin separates from the glass.

In the manufacture of sheet molding compound or bulk molding compound, the chemical thickener, promotor, catalyst, reinforcing agent, fillers, and lubricants are blended with the unsaturated polyester resin component and the unsaturated or vinyl monomer component. Subsequently, the molding compound is formed into a sheet and wound onto a reel or it is formed into pellets or sausages in bulk.

It is an objective in SMC and BMC manufacture to find promotors and catalysts which can be blended in the molding composition at the time of compounding that will permit the compound to remain substantially inactive at temperatures below the molding temperature to give suitable "shelf life" and yet be sufficiently reactive for catalyzing or promoting the cure at the molding temperature. Many of the so called catalysts or promotors for curing unsaturated polyester resin are unsuited for the manufacture of sheet molding compound or bulk molding compound because they are so reactive that they cause gelation at room temperature within minutes or a few days.

2. Description of the Prior Art

A number of patents report the use of metallic salts in promoting the cure rate of unsaturated polyester resin. Typical soluble salts of reactive metals include manganese octanoate, cobalt naphthenate, cobalt decanoate, lithium octanoate, lithium thiocyanate, aluminum laurate, aluminum octoate and gallium octoate. These salts, however, are too reactive and result in SMC and BMC having a short shelf life.

U.S. Pat. No. 3,988,290 contributed substantially to the state of the art and discloses the use of cobaltic salts as promotors for unsaturated polyester resins chemically thickened with a Group II metal oxide or hydroxide. Typically, cobaltic acetylacetonate is included with magnesium oxide or magnesium hydroxide for the purpose of extending the shelf life of the unsaturated polyester resin, and for providing an enhanced rate of cure at molding temperatures.

U.S. Pat. No. 3,584,076 discloses a method for initiating polymerization of an unsaturated polyester resin by incorporating a peroxide or perester catalyst, e.g. t-butyl perbenzoate in combination with a cobalt salt, e.g. cobalt octoate and an enolizable ketone such as 2,4-pentanedione. However, the molding compound has a short shelf life compared to other systems.

U.S. Pat. No. 3,398,213 discloses the use of a chelating agent in combination with a cobalt salt and peroxide catalyst as an initiator for unsaturated polyester resins. Cobalt II acetylacetonate and cobalt naphthenate were some of the cobalt salts suggested as being suited for initiating polymerization.

U.S. Pat. No. 3,239,581 discloses a method for accelerating the polymerization of an unsaturated polyester by including small catalytic amounts of a cobalt compound in combination with a free radical forming catalyst, e.g. a peroxide, or perester. Additionally, a trivalent phosphorus compound is added to the composition to prevent discoloration of the unsaturated polyester resin.

SUMMARY OF THE INVENTION

It has been found that the shelf life of a molding compound comprising an unsaturated polyester resin and an unsaturated monomer, soluble and copolymerizable therewith, preferably chemically thickened with a Group II metal oxide or hydroxide, can be extended, while at the same cured in a very short time at molding temperatures, by including an effective proportion of a substituted acetylacetonate ligand of cobalt III. The presence of an electron withdrawing group on the acetylacetonate moiety substantially enhances the overall effectiveness or potency of the cobaltic promoter.

Advantages of this invention include:

the ability to prepare a sheet molding compound (SMC) and bulk molding comound (BMC) having a shelf life which is extremely desirous;

the ability to effect rapid acceleration during cure with significantly less promoter material (weight basis) than used heretofore in the molding composition; and the ability to formulate a molding compound which has a high "kick-off" temperature thus permitting greater time for the formulation to fill the mold before gelation occurs.

DESCRIPTION OF THE PREFERRED EMBODIMENTS

In manufacturing a polyester molding compound or a molding compound referred to as sheet molding compound or bulk molding compound, it is necessary to synthesize a thermosettable polyester resin, i.e., a product of an esterification reaction between at least one unsaturated polycarboxylic acid (or anhydride thereof) and at least one polyhydric alcohol. Typical polycarboxylic acids for such synthesis include maleic, fumaric, mesaconic, citraconic and glutaconic acids. Some saturated polycarboxylic acids can be included e.g., up to 40% of the unsaturated acid where desired. These include phthalic (iso and ortho), succinic, adipic and sebacic acid. Typical polyhydric alcohols suited for polyester synthesis include glycols such as diethylene glycol, trimethylene glycol, propylene glycol, ethylene glycol; and trimethylol propane and their alkoxylated counterparts.

An unsaturated monomer is combined with the unsaturated polyester resin in order to permit cross-linking with the unsaturated polyester component to form a thermoset polyester resin. In the copolymerization between the unsaturated monomer and unsaturated polyester resin, the resin converts from the liquid to solid form and becomes substantially cross-linked and infusible. Unsaturated monomers cross-linkable with the unsaturated polyester resin should be substantially soluble in the unsaturated polyester resin to permit uniform dispersion. Examples of unsaturated monomers suited for cross-linking thermosettable polyester resins include vinyl monomers e.g., styrene, butadiene, methylstyrene, methyl methacrylate, ethyl acrylate, vinyl acetate, vinyl toluene, and allyl monomers e.g., allyl acetate, and allyl alcohol. Styrene is the preferred monomer for polyester synthesis.

In the case of SMC or BMC, a chemical thickener is added to the thermosettable polyester resin including the unsaturated monomer to permit thickening of the resin composition for subsequent handling. As mentioned earlier, the use of chemical thickeners for increasing the viscosity of unsaturated polyester resins and unsaturated monomer is known. Generally, the chemical thickeners are the Group II metal oxides and hydroxides. Particularly effective are magnesium oxide and hydroxide and calcium oxide and hydroxide. These thickeners are employed in conventional amounts e.g., from 0.5-25 parts per 100 parts resin and generally from 1-5 parts per 100 parts.

The cobaltic promoters useful for practicing this invention are cobalt (III) complexes containing acetylacetonate ligands with at least one of these ligands bearing a substituent electron withdrawing group. The cobaltic promotors may be mono, di, or trisubstituted. Experimental testing has generally shown that the greater the electron withdrawing capability of the substituent group, the more reactive or potent, in terms of enhancing cure, the promotor. Therefore, for a given substituent group, the trisubstituted generally is more reactive than the di, and the disubstituted being more reactive than the mono substituted composition.

The cobaltic promotors have a pseudo-octehedral stereochemistry and are best described by the formula below:

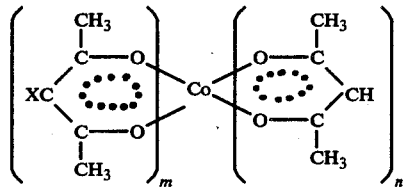

wherein
m can be 1, 2 or 3;
n can be 0, 1, and 2, and m + n = 3; and
X is an electron withdrawing group, but nonpolymerizable with the polyester molding compound.

The electron withdrawing group (X) which is pendant from the acetylacetonate ligand can be any electron withdrawing group which does not polymerize with the unsaturated monomer or unsaturated portion of the polycarboxylic acid. Electron withdrawing groups are known and examples include: halogen atoms, e.g. fluorine, chlorine, iodine and bromine; SCN; organosulfonate ($SO_3R$) where the R group is lower 1-6 alkyl group, cycloalkyl, or aryl; ketone, e.g. aryl, cycloalkyl, or alkyl ($C_{1-6}$); an ester (COOR) where the R group is cycloalkyl, alkyl, and aryl; nitrile; phenyl, which includes substituted phenyl, e.g. chlorophenyl and pentafluorophenyl; formyl; and nitro group. Other groups that could be included are: thionyl halide, sulfenylhalide, haloalkyl, hydroxyl, carboxyl, quaternary ammonium, and azido.

The preferred electron withdrawing groups are nitro, halogen, (particularly chloro and bromo) and phenyl groups. Although the other groups are effective, these particular substituent groups readily activate the cobaltic promotor without adversely affecting the physical properties of the resulting polyester resin.

Examples of cobaltic promoters preferred in the practice of this invention include: tris (3-nitroacetylacetonato) cobalt (III), bis (acetylacetonato) (3-nitroacetylacetonato) cobalt (III), tris (3-bromoacetylacetonato) cobalt (III), bis (3-acetylacetylacetonato) (acetylacetonato) cobalt (III), tris (3-chloroacetylacetonato) cobalt (III), bis (3-formylacetylacetonato) (acetylacetonato) cobalt (III) and tris (3-phenylacetylacetonato) cobalt (III).

In practicing the invention, an amount of cobaltic promoter effective for providing for enhanced cure rate without adversely affecting the shelf life is added to the molding composition. Generally, for most of these cobaltic promotors, the promotor is added in a proportion to provide from about 0.0005 to about 0.025, and preferably about 0.001-0.010 parts cobaltic metal per 100 parts by weight of the polyester resin (phr) including unsaturated monomer. The amount of cobaltic promotor can be varied within this particular range depending upon the strength of the electron withdrawing groups and the result desired. Typically, the promoter is added in concentrations toward the middle to upper end of the range, e.g. 0.01 parts when the promoter is monosubstituted or the electron withdrawing group is relatively weak e.g., in the case of an acetyl, mercapto or iodine group. On the other hand, where the electron withdrawing groups are relatively strong or potent, the concentration of promoter can be reduced toward the lower end of the scale, e.g. 0.006 phr.

Although the cobaltic promoter acts as an initiator in its own right, generally, a perester, a peroxide or a hydroperoxide initiator, in a proportion of from 0.25-2 parts by weight of the unsaturated polyester and unsaturated monomer is added in combination with the cobaltic promoter to give a faster cure. The initiators should be selected with care as some of the initiators are less stable and more reactive than others and thereby tend to shorten the shelf life of the molding compound. For example, a blend of methylethylketone peroxide and substituted cobaltic acetylacetonate will have a shorter shelf life than the more stable t-butyl perbenzoate and the same cobaltic promoter. Examples of perester, peroxy and hydroperoxide initiators which can be used in practicing the invention include t-butylperbenzoate, t-butylperoctoate, 2,5-dimethyl-2,5-bis-(2-ethylhexanoylperoxy)hexane, cumene hydroperoxide, 1,1,3,3-tetramethyl butyl hydroperoxide and methyl ethyl ketone peroxide.

As is known, various components can be added in the manufacture of SMC and BMC for their desired effects. Siccative oils can be added to the polyester composition for the manufacture of alkyd type sheet and bulk molding compound. Examples of siccative oils suited for this use are oiticicia, tung, linseed, soya bean, and castor. Fillers e.g., calcium carbonate, clay, asbestos, and aluminum hydrate; lubricants such as zinc stearate, calcium stearate, polyethylene; and pigments e.g., titanium dioxide, ferric oxide, litharge, zinc oxide, zinc sulfide, and the like can be employed for their desired purpose.

Quite often it is advantageous to prepare reinforced polyesters and this typically is accomplished by incorporating glass fibers having a length of about ¼ to 2" into the molding compound.

In more recent times, it has been customary to add a low shrink or low profile component to the molding compound to prevent shrinkage during molding. Absent a low shrink or low profile component, it is difficult to obtain great precision in preparing molded parts or the surface may have waves or ribs. Generally, a low shrink or low profile component is a thermoplastic (which may have some unsaturation) dissolved in vinyl monomer, and it is exuded from the mixture of polyester resin and vinyl monomer as a discontinuous phase during cure, thus filling the void left by the shrinking of the polyester resin. Typical low shrink additives include thermoplastics such as polyacrylates, e.g., polymethylmethacrylate, polyvinylchloride, polyethylene, polyvinylacetate, and so forth. Those conventionally used in the practice of making low profile or low shrink resins can be used here.

A typical molding composition suited for making bulk and sheet molding compound comprises:

| MATERIALS | | PARTS BY WEIGHT |
|---|---|---|
| 60 parts unsaturated polyester resin in styrene: 40 parts thermoplastic resin in styrene (resin) | | 25 to 30 |
| Calcium carbonate filler | | 40 to 55 |
| Lubricant (zinc stearate) | | 1 to 2 |
| Thickener, magnesium hydroxide or magnesium oxide | Parts per 100 parts resin (PHR) | 2 to 3 |
| Catalyst (t-butyl perbenzoate) | PHR | 0.8 to 1.2 |
| Glass Reinforcement | | 10 to 30 |

These materials are blended in a heavy duty kneader or mill to effect thorough homogeneity. The premixed paste can be blended with chopped fiberglass on a sheet molding machine. The blended charge or premix is matured for several days and cut to convenient size, molded and cured at temperatures ranging from about 250 to 325° F for a short time, e.g., 1 to 3 minutes.

The following examples are provided to illustrate preferred embodiments of the invention and are not intended to restrict the scope thereof. All parts are parts by weight, and all percentages expressed as weight percentages. The resin used for formulating the molding compositions were Paraplex P-340, which is a styrene solution of a highly reactive polyester made from glycols (7.3 moles propylene glycol to 0.7 ethylene glycol) with cis and trans-butenedioic acid (commonly referred to as fumaric and maleic acid), the polyester being present in a proportion of from about 65 to 70 parts by weight and the styrene being present in a proportion of from 35 to 30 parts by weight and Paraplex 701 which is a low shrink component comprising a thermoplastic acrylate resin in styrene. Both Paraplex P-340 and Paraplex P-701 are trademarks of Rohm and Haas Co. and the combination of P-340 and P-701 in a 60:40 ratio is sold together under the mark Paraplex P-19D. This combined product is labeled resin in the Examples.

The neat resins were evaluated for gel time, cure time, peak exotherm and kick-off time. Acceleration was determined by calculating the reduction in cure time observed for the promoted resin from cure time observed for the control. Although the data may vary for neat resin from that in the molding compound, the information is valuable as an aid in predicting what will happen when formulated.

The molding compounds which comprised catalyst, thickener etc. except glass fiber as described previously, were tested for gel time, shelf life, acceleration rate, kick-off temperature, and peak exotherm by the standard Block Test Method using the SPI procedure for running exotherm curves as set forth in the Proceedings of the 24th Annual Technical Conference, 1969; Reinforced Plastics/Composites Institute; The Society of Plastics Industry. Accelerated shelf life stability was determined by storing 300 gram charges of each of the compositions (pastes) less fiberglass in capped cans at 100° F immediately after compounding. The contents of each can were checked daily for penetrability by inserting a screwdriver into the resin. When the tip of the screwdriver blade could no longer be pushed to the bottom, the paste was considered no longer moldable on the press and its shelf life was considered terminated. A 30% acceleration rate as used in the example refers to reduction in cure time of 30% based on the cure time for an unpromoted but initiated polyester composition.

EXAMPLE I

The following tests were conducted to determine the effectiveness of tris (3-bromoacetylacetonato) cobalt (III) promoter in comparison to cobalt naphthenate (added as a 6% solution in mineral spirits) in an uninitiated system.

| | 1 | 2 | 3 |
|---|---|---|---|
| Resin | 100 | 100 | 100 |
| tris(3-bromoacetyl-acetonate) cobalt (III) | — | 0.003* | — |
| 6% Cobalt Naphthenate | — | — | 0.05* |
| Gel Time (min.) | 21.5 | 16.9 | 21.5 |
| Cure Time (min.) | 33.5 | 21.5 | 33.5 |
| Peak Exotherm ° F | 315 | 350 | 315 |
| % Acceleration | — | 36 | — |

*Added at 0.003 and 0.05 gm equivalents of Co metal respectively.

The above examples show that the tribromo substituted acetylacetonate cobalt complex functions as an initiator, whereas the cobalt II naphthenate salt has no initiating ability.

EXAMPLE II

A series of experimental tests were conducted using various substituted cobalt III acetylacetonates against cobalt III acetylacetonate and cobalt napthenate II as controls in neat polyester resin. The production of cobaltic compound in parts by weight and the gram equivalents of cobalt metal as well as the results obtained are given in the following tables.

TABLE 1

| | Control | Example | | | | |
|---|---|---|---|---|---|---|
| | −1 | −2 | −3 | −4 | −5 | −6 |
| Resin | 100 | 100 | 100 | 100 | 100 | 100 |
| Cobalt III Acetylacetonate | — | 0.15 | .075 | 0.0375 | 0.019 | — |
| 6% Cobalt naphthenate | — | — | — | — | — | 0.2 |
| Gram equivalents cobalt | — | 0.0248 | 0.0124 | 0.0062 | 0.0031 | 0.012 |
| t-butylperbenzoate | 1.0 | 1.0 | 1.0 | 1.0 | 1.0 | 1.0 |

TABLE 1-continued

|  | Control | Example | | | | |
|---|---|---|---|---|---|---|
|  | −1 | −2 | −3 | −4 | −5 | −6 |
| SPI Block Exotherm Data - 300° F | | | | | | |
| Gel Time (min.) | 1.59 | 0.89 | 1.06 | 1.19 | 1.24 | |
| Cure Time (min.) | 1.95 | 1.29 | 1.39 | 1.56 | 1.62 | 0.59 |
| Peak Exotherm (° F) | 397° | 411° | 427° | 402° | 405° | |
| Kick-off Temp. (° F) | 268° | 238° | 252° | 247° | 254° | |
| Acceleration % | — | 33.8 | 28.7 | 20 | 16.9 | |
| Accelerated Aging - 100° F Shelf Life | | | | | | |
| Days | 13–14 | 8–11 | 8–11 | 12–13 | 13–14 | <2 |

TABLE 2

|  | −1 | −2 | −3 | −4 | −5 |
|---|---|---|---|---|---|
| Resin | 100 | 100 | 100 | 100 | 100 |
| Cobaltic acetylacetonate | — | 0.15 | — | — | — |
| bis(3-acetylacetylacetonato) (acetylacetonato) cobalt III | — | — | 0.18 | 0.046 | 0.19 |
| Gram equivalents cobalt | — | 0.0248 | 0.0248 | 0.0062 | 0.0025 |
| t-butylperbenzoate | 1.0 | 1.0 | 1.0 | 1.0 | 1.0 |
| SPI Block Exotherm Data - 300° F | | | | | |
| Gel Time (min.) | 1.57 | 0.95 | 0.79 | 0.79 | 0.90 |
| Cure Time (min.) | 1.89 | 1.27 | 1.24 | 1.18 | 1.32 |
| Peak Exotherm (° F) | 407° | 396° | 374° | 386° | 425° |
| Kick-off Temp. (° F) | 263° | 255° | 253° | 241° | 247° |
| Acceleration % | — | 32.8 | 34.3 | 37.5 | 30.1 |
| Accelerated Aging - 100° F Shelf Life | | | | | |
| Days | 14–15 | 8–9 | 7–8 | 9–10 | 10–12 |

TABLE 3

|  | −1 | −2 | −3 | −4 | −5 |
|---|---|---|---|---|---|
| Resin | 100 | 100 | 100 | 100 | 100 |
| Cobaltic acetylacetonate | — | 0.15 | — | — | — |
| tris(3-chloroacetylacetonato) cobalt (III) | — | — | 0.193 | 0.048 | 0.012 |
| Gram equivalent cobalt | — | 0.0248 | 0.0248 | 0.0062 | 0.0016 |
| t-butylperbenzoate | 1.0 | 1.0 | 1.0 | 1.0 | 1.0 |
| SPI Block Exotherm Data - 300° F | | | | | |
| Gel Time (min.) | 1.42 | 0.82 | 0.20 | 0.57 | 1.04 |
| Cure Time (min.) | 1.69 | 1.13 | 0.45 | 0.82 | 1.29 |
| Peak Exotherm (° F) | 423° | 395° | 397° | 453° | 407° |
| Kick-off Temp. (° F) | 257° | 245° | 227° | 227° | 227° |
| Acceleration % | — | 33.1 | 73.3 | 51.4 | 23.6 |
| Accelerated Aging - 100° F Shelf Life | | | | | |
| Days | 16–19 | 7–8 | 2–5 | 5–6 | 9–12 |

TABLE 4

|  | −1 | −2 | −3 | −4 | −5 | −6 |
|---|---|---|---|---|---|---|
| Resin | 100 | 100 | 100 | 100 | 100 | 100 |
| Cobalt III acetylacetonate | — | 0.15 | — | — | — | — |
| bis(3-formylacetylacetonato) (acetylacetonato) cobalt (III) | — | — | 0.174 | 0.087 | 0.044 | 0.017 |
| Gram equivalents cobalt | — | 0.0248 | 0.0248 | 0.0124 | 0.0062 | 0.0025 |
| t-butylperbenzoate | 1.0 | 1.0 | 1.0 | 1.0 | 1.0 | 1.0 |
| SPI Block Exotherm Data - 300° F | | | | | | |
| Gel Time (min.) | 1.52 | 0.93 | 0.89 | 0.74 | 0.88 | 1.09 |
| Cure Time (min.) | 1.85 | 1.29 | 1.21 | 1.07 | 1.14 | 1.46 |
| Peak Exotherm (° F) | 405° | 412° | 397° | 412° | 399° | 407° |
| Kick-off Temp. (° F) | 278° | 250° | 242° | 247° | 236° | 256° |
| Acceleration % | — | 30.2 | 34.5 | 42.1 | 38.3 | 21.0 |
| Accelerated Aging - 100° F Shelf Life | | | | | | |
| Days | 13–14 | 9–10 | 2–3 | 2–3 | 3–4 | 6–7 |

TABLE 5

|  | −1 | −2 | −3 | −4 | −5 | −6 |
|---|---|---|---|---|---|---|
| Resin | 100 | 100 | 100 | 100 | 100 | 100 |
| Cobalt III acetylacetonate | — | 0.15 | — | — | — | — |
| tris(3-phenylacetylacetonato) cobalt (III) | — | — | 0.241 | 0.060 | 0.030 | 0.015 |
| Gram equivalent cobalt | — | 0.0248 | 0.0248 | 0.0062 | 0.031 | 0.0016 |
| t-butylperbenzoate | 1.0 | 1.0 | 1.0 | 1.0 | 1.0 | 1.0 |
| SPI Block Exotherm Data - 300° F | | | | | | |
| Gel Time (min.) | 1.55 | 0.95 | 0.61 | 0.79 | 0.93 | 1.12 |
| Cure Time (min.) | 1.92 | 1.34 | 0.94 | 1.10 | 1.18 | 1.46 |
| Peak Exotherm (° F) | 402° | 405° | 404° | 417° | 421° | 403° |
| Kick-off Temp. (° F) | 264° | 250° | 219° | 230° | 235° | 246° |
| Acceleration % | — | 30.2 | 51.0 | 42.7 | 38.5 | 23.9 |
| Accelerated Aging - 100° F Shelf Life | | | | | | |

TABLE 5-continued

| Days | −1 | −2 | −3 | −4 | −5 | −6 |
|---|---|---|---|---|---|---|
| Days | 13-14 | 7-8 | 4-7 | 7-8 | 10-11 | 11-14 |

TABLE 6

| | −1 | −2 | −3 | −4 | −5 | −6 | −7 | −8 |
|---|---|---|---|---|---|---|---|---|
| Resin | 100 | 100 | 100 | 100 | 100 | 100 | 100 | 100 |
| Cobalt III acetylacetonate | — | 0.15 | — | — | — | — | — | — |
| bis(acetylacetonato) (3-nitroacetylacetonato) cobalt (III) | — | — | 0.169 | 0.084 | 0.042 | 0.021 | 0.014 | 0.011 |
| Gram equivalent cobalt | — | 0.0248 | 0.0248 | 0.0124 | 0.0062 | 0.0031 | 0.0021 | 0.0016 |
| t-butylperbenzoate | 1.0 | 1.0 | 1.0 | 1.0 | 1.0 | 1.0 | 1.0 | 1.0 |
| SPI Block Exotherm Data - 300° F | | | | | | | | |
| Gel Time (min.) | 1.46 | 0.97 | 0.63 | 0.68 | 0.74 | 0.91 | 0.91 | 1.04 |
| Cure Time (min.) | 1.93 | 1.35 | 1.08 | 0.97 | 1.07 | 1.21 | 1.27 | 1.45 |
| Peak Exotherm (° F) | 395° | 412° | 385° | 420° | 430° | 408° | 423° | 401° |
| Kick-off Temp. (° F) | 763° | 244° | 213° | 230° | 266° | 234° | 230° | 241° |
| Acceleration % | — | 30.0 | 44.0 | 49.7 | 44.5 | 37.3 | 34.1 | 24.8 |
| Accelerated Aging - 100° F Shelf Life | | | | | | | | |
| Days | 13-14 | 7-8 | 1-2 | 2-3 | 3-4 | 4-5 | 5-6 | 6-7 |

TABLE 7

| | −1 | −2 | −3 | −4 | −5 | −6 | −7 |
|---|---|---|---|---|---|---|---|
| Resin | 100 | 100 | 100 | 100 | 100 | 100 | 100 |
| Cobalt III acetylacetonate | — | 0.15 | — | — | — | — | — |
| bis(3-nitroacetylacetonato) (acetylacetonato) cobalt (III) | — | — | 0.188 | 0.094 | 0.047 | 0.024 | 0.012 |
| Gram equivalent cobalt | — | 0.0248 | 0.0248 | 0.0124 | 0.0062 | 0.0031 | 0.0016 |
| t-butylperbenzoate | 1.0 | 1.0 | 1.0 | 1.0 | 1.0 | 1.0 | 1.0 |
| SPI Block Exotherm Data - 300° F | | | | | | | |
| Gel Time (min.) | 1.62 | 0.95 | 0.62 | 0.62 | 0.76 | 0.86 | 0.95 |
| Cure Time (min.) | 2.00 | 1.34 | 1.04 | 1.02 | 1.12 | 1.32 | 1.36 |
| Peak Exotherm (° F) | 409° | 405° | 415° | 403° | 410° | 409° | 411° |
| Kick-off Temp. (° F) | 265° | 250° | 223° | 230° | 233° | 244° | 236° |
| Acceleration % | — | 33 | 48 | 49 | 44 | 34 | 32 |
| Accelerated Aging - 100° F Shelf Life | | | | | | | |
| Days | 11-14 | 7-8 | 1-2 | 1-2 | 2-3 | 3-4 | 6-7 |

TABLE 8

| | −1 | −2 | −3 | −4 | −5 | −6 | −7 | −8 | −9 |
|---|---|---|---|---|---|---|---|---|---|
| Resin | 100 | 100 | 100 | 100 | 100 | 100 | 100 | 100 | 100 |
| Cobalt III acetylacetonate | — | 0.15 | — | — | — | — | — | — | — |
| tris(3-nitroacetylacetonato) cobalt (III) | — | — | 0.207 | 0.014 | 0.052 | 0.026 | 0.021 | 0.013 | 0.010 |
| Gram equivalent cobalt | — | 0.0248 | 0.0248 | 0.0124 | 0.0062 | 0.0231 | 0.0025 | 0.0016 | 0.0012 |
| t-butylperbenzoate | 1.0 | 1.0 | 1.0 | 1.0 | 1.0 | 1.0 | 1.0 | 1.0 | 1.0 |
| SPI Block Exotherm Data - 300° F | | | | | | | | | |
| Gel Time (min.) | 1.44 | 0.82 | 0.57 | 0.44 | 0.47 | 0.61 | 0.65 | 0.90 | 1.02 |
| Cure Time (min.) | 1.75 | 1.13 | 1.07 | 0.86 | 0.81 | 0.97 | 1.01 | 1.24 | 1.31 |
| Peak Exotherm (° F) | 402° | 395° | 395° | 423° | 427° | 411° | 409° | 408° | 397° |
| Kick-off Temp. (° F) | 265° | 245° | 215° | 210° | 220° | 234° | 228° | 237° | 239° |
| Acceleration % | — | 35.4 | 38.8 | 50.8 | 53.7 | 44.5 | 28.5 | 29.1 | 25.1 |
| Accelerated Aging - 100° F Shelf Life | | | | | | | | | |
| Days | 14-17 | 8-9 | <⅔ | <⅔ | ⅔-1 | 1-2 | 2-3 | 3-4 | 6-7 |

TABLE 9

| | −1 | −2 | −3 | −4 | −5 | −6 |
|---|---|---|---|---|---|---|
| Resin | 100 | 100 | 100 | 100 | 100 | 100 |
| Cobalt III acetylacetonate | — | 0.15 | — | — | — | — |
| tris(3-bromoacetylacetonato) cobalt (III) | — | — | 0.062 | 0.031 | 0.021 | 0.0156 |
| Gram equivalent cobalt | — | 0.0248 | 0.0062 | 0.0031 | 0.0021 | 0.0016 |
| t-butylperbenzoate | 1.0 | 1.0 | 1.0 | 1.0 | 1.0 | 1.0 |
| SPI Block Exotherm Data - 300° F | | | | | | |
| Gel Time (min.) | 1.54 | 1.05 | 0.65 | 0.90 | 0.95 | 1.24 |
| Cure Time (min.) | 1.87 | 1.32 | 0.94 | 1.15 | 1.25 | 1.49 |
| Peak Exotherm (° F) | 413° | 420° | 422° | 403° | 413° | 403° |
| Kick-off Temp. (° F) | 267° | 275° | 243° | 288° | 295° | 280° |
| Acceleration % | — | 27.8 | 48.6 | 37.1 | 31.6 | 18.5 |
| Accelerated Aging - 100° F Shelf Life | | | | | | |
| Days | 16-18 | 10-11 | 12-13 | 14-15 | 15 | 14-17 |

TABLE 10

|  | −1 | −2 | −3 | −4 |
|---|---|---|---|---|
| Resin | 100 | 100 | 100 | 100 |
| tris(3-bromoacetylacetonato) cobalt (III) .3CCl₄ | — | 0.444 | 0.111 | 0.028 |
| Gram equivalent cobalt | — | 0.0248 | 0.0062 | 0.0016 |
| t-butylperbenzoate | 1 | 1 | 1 | 1 |
| SPI Block Exotherm Data - 300° F | | | | |
| Gel Time (min.) | 1.36 | 0.23 | 0.48 | 0.80 |
| Cure Time (min.) | 1.63 | 0.54 | 0.81 | 1.03 |
| Peak Exotherm (° F) | 430° | 405° | 437° | 428° |
| Kick-off Temp. (° F) | 265° | 190° | 220° | 235° |
| Acceleration % | — | 66.8 | 50.3 | 36.8 |
| Accelerated Aging - 100° F Shelf Life | | | | |
| Days | 15–18 | 6–7 | 7–12 | 11–12 |

TABLE 11

|  | −1 | −2 | −3 | −4 | −5 | −6 |
|---|---|---|---|---|---|---|
| Resin | 100 | 100 | 100 | 100 | 100 | 100 |
| Zinc Stearate | 5 | 5 | 5 | 5 | 5 | 5 |
| Cobalt III Acetylacetonate | — | 0.15 | — | — | — | — |
| bis(3-nitroacetylacetonato) (acetylacetonato) cobalt (III) | — | — | 0.047 | 0.024 | 0.016 | 0.009 |
| Gram equivalent cobalt | — | 0.0248 | 0.0062 | 0.0031 | 0.0021 | 0.0012 |
| CaCO₃ | 150 | 150 | 150 | 150 | 150 | 150 |
| Mg(OH)₂ | 2.5 | 2.5 | 2.5 | 2.5 | 2.5 | 2.5 |
| t-butylperbenzoate | 1.0 | 1.0 | 1.0 | 1.0 | 1.0 | 1.0 |
| SPI Block Exotherm Data - 300° F | | | | | | |
| Gel Time (min.) | 1.80 | 1.29 | 0.93 | 1.12 | 1.27 | 1.36 |
| Cure Time (min.) | 2.07 | 1.48 | 1.08 | 1.30 | 1.45 | 1.56 |
| Peak Exotherm (° F) | 375° | 370° | 373° | 375° | 378° | 378° |
| Kick-off Temp. (° F) | 288° | 270° | 278° | 270° | 275° | 283° |
| Acceleration % | — | 28.5 | 47.8 | 37.1 | 29.9 | 24.6 |
| Accelerated Aging - 100° F Shelf Life | | | | | | |
| Days | 23–24 | 16–17 | 5–6 | 7–8 | 9–12 | 13–14 |

TABLE 12

|  | −1 | −2 | −3 | −4 | −5 | −6 |
|---|---|---|---|---|---|---|
| Resin | 100 | 100 | 100 | 100 | 100 | 100 |
| Zinc Stearate | 5 | 5 | 5 | 5 | 5 | 5 |
| Cobalt III acetylacetonate | — | 0.15 | — | — | — | — |
| tris(3-nitroacetylacetonato) cobalt (III) | — | — | 0.052 | 0.026 | 0.017 | 0.013 |
| Gram equivalent cobalt | — | 0.0248 | 0.0062 | 0.0031 | 0.0021 | 0.0016 |
| CaCO₃ | 150 | 150 | 150 | 150 | 150 | 150 |
| Mg(OH)₂ | 2.5 | 2.5 | 2.5 | 2.5 | 2.5 | 2.5 |
| t-butylperbenzoate | 1.0 | 1.0 | 1.0 | 1.0 | 1.0 | 1.0 |
| SPI Block Exotherm Data - 300° F | | | | | | |
| Gel Time (min.) | 1.92 | 1.27 | 0.74 | 0.87 | 1.04 | 1.35 |
| Cure Time (min.) | 2.15 | 1.46 | 0.91 | 1.04 | 1.21 | 1.54 |
| Peak Exotherm (° F) | 381° | 373° | 370° | 374° | 377° | 375° |
| Kick-off Temp. (° F) | 289° | 268° | 263° | 274° | 273° | 273° |
| Acceleration % | — | 32.0 | 57.6 | 51.6 | 43.7 | 28.3 |
| Accelerated Aging - 100° F Shelf Life | | | | | | |
| Days | 24–27 | 16–17 | 3–6 | 6–7 | 7–8 | 9–10 |

TABLE 13

|  | −1 | −2 | −3 | −4 | −5 | −6 |
|---|---|---|---|---|---|---|
| Resin | 100 | 100 | 100 | 100 | 100 | 100 |
| Zinc Stearate | 5 | 5 | 5 | 5 | 5 | 5 |
| Cobalt III acetylacetonate | — | 0.15 | — | — | — | — |
| tris(3-bromoacetylacetonato) cobalt (III) | — | — | 0.062 | 0.031 | 0.021 | 0.0156 |
| Gram equivalent cobalt | — | 0.0248 | 0.0062 | 0.0031 | 0.0021 | 0.0016 |
| CaCO₃ | 150 | 150 | 150 | 150 | 150 | 150 |
| Mg(OH)₂ | 2.5 | 2.5 | 2.5 | 2.5 | 2.5 | 2.5 |
| t-butylperbenzoate | 1.0 | 1.0 | 1.0 | 1.0 | 1.0 | 1.0 |
| SPI Block Exotherm Data - 300° F | | | | | | |
| Gel Time (min.) | 1.73 | 1.21 | 0.76 | 0.81 | 0.89 | 1.10 |
| Cure Time (min.) | 1.99 | 1.36 | 0.92 | 0.99 | 1.08 | 1.28 |
| Peak Exotherm (° F) | 378° | 375° | 368° | 373° | 375° | 378° |
| Kick-off Temp. (° F) | 291° | 878° | 265° | 270° | 270° | 278° |
| Acceleration % | — | 31.6 | 53.7 | 50.2 | 45.7 | 35.6 |
| Accelerated Aging - 100° F Shelf Life | | | | | | |
| Days | 28–31 | 20–24 | 17 | 19–20 | 21–22 | 23–26 |

What is claimed is:

1. In a process for curing a molding compound comprising an unsaturated polyester resin with an unsaturated monomer, soluble and copolymerizable therewith, the improvement which comprises:
   incorporating at least a proportion effective for enhancing the rate of cure at molding temperatures and enhancing shelf life at lower temperature of a cobalt (III) complex of the formula:

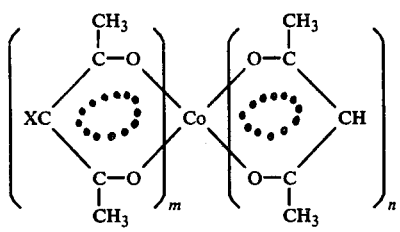

wherein m can be 1, 2 or 3; m
n can be 0, 1, and 2, and M + n = 3; and
X is an electron withdrawing group, nonpolymerizable with said molding compound.

2. The process of claim 1 wherein said electron withdrawing group is selected from the group consisting of halogen, nitro, formyl; aryl, cycloalkyl or alkyl carbonyl, phenyl, SCN, lower alkyl ester, organosulfonate, nitrile, thionyl halide, sulfenyl halide, haloalkyl, hydroxy, carboxyl and quaternary ammonium.

3. The process of claim 2 wherein a chemical thickener consisting of a Group II metal oxide or hydroxide is included in said molding compound.

4. The process of claim 3 wherein said cobalt III complex is provided in a proportion to provide from about 0.0005 to about 0.025 parts cobalt metal per 100 parts by weight unsaturated polyester resin.

5. The process of claim 4 wherein said chemical thickener is selected from the group consisting of magnesium oxide and magnesium hydroxide.

6. The process of claim 5 wherein said molding compound contains an effective proportion of a free radical initiating catalyst.

7. The process of claim 6 wherein said free radical initiating catalyst is selected from the group consisting of perester, a peroxide, and a hydroperoxide.

8. The process of claim 5 wherein said electron withdrawing group is selected from the group consisting of nitro, bromo, chloro, and phenyl.

9. The process of claim 7 wherein m in said cobalt III complex is at least 2.

10. The process of claim 9 wherein said cobalt III complex is selected from the group consisting of tris(3-nitroacetylacetonato) cobalt (III) and tris(3-bromoacetylacetonato) cobalt (III).

11. In a thermosettable molding compound comprising an unsaturated polyester resin and an unsaturated monomer soluble in and copolymerizable therewith, the improvement which comprises:
a proportion of a cobalt (III) complex effective for enhancing the rate of cure represented by the formula:

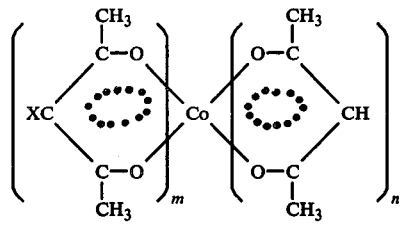

wherein m can be 1, 2 or 3;
n can be 0, 1, and 2, and m + n = 3; and
X is an electron withdrawing group, but nonpolymerizable with said molding compound.

12. The molding compound of claim 11 wherein said electron withdrawing group is selected from the group consisting of halogen, nitro, formyl residue; an aryl, cycloalkyl or alkyl carbonyl, phenyl, lower alkyl ester, organosulfonate, nitrile, thionyl, sulfonyl halide, haloalkyl, hydroxyl, carboxyl, and quaternary ammonium.

13. The molding compound of claim 12 wherein a chemical thickener consisting of a Group II metal oxide or hydroxide is included in said molding compound.

14. The molding compound of claim 13 wherein said cobalt III complex is provided in proportion to provide from about 0.0005 to about 0.025 parts cobalt metal per 100 parts by weight unsaturated polyester resin.

15. The molding compound of claim 14 wherein said chemical thickener is selected from the group consisting of magnesium oxide and magnesium hydroxide.

16. The molding compound of claim 15 wherein said molding compound contains an effective proportion of a free radical initiating catalyst.

17. The molding compound of claim 16 wherein catalyst is selected from the group consisting of perester, a peroxide, and a hydroperoxide.

18. The molding compound of claim 17 wherein said electron withdrawing group is selected from the group consisting of nitro bromo, chloro and phenyl.

19. The molding compound of claim 18 wherein m in said cobalt III complex is at least 2.

20. The molding compound of claim 19 wherein said cobalt III complex is selected from the group consisting of tris(3-nitroacetylacetonato) cobalt (III) and tris(3-bromoacetylacetonato) cobalt (III).

* * * * *

UNITED STATES PATENT AND TRADEMARK OFFICE
CERTIFICATE OF CORRECTION

PATENT NO. : 4,138,385

DATED : February 6, 1979

INVENTOR(S) : Melville Willard Uffner et al.

It is certified that error appears in the above—identified patent and that said Letters Patent are hereby corrected as shown below:

Columns 7, 8, 9 and 11, TABLES 1, 2, 3, 4 and 5 should be deleted and the TABLES as shown on the attached sheets substituted therefor.

Signed and Sealed this

Twenty-first Day of August 1979

[SEAL]

Attest:

Attesting Officer

LUTRELLE F. PARKER

Acting Commissioner of Patents and Trademarks

TABLE 1

Control Example

| | -1 | -2 | -3 | -4 | -5 | -6 |
|---|---|---|---|---|---|---|
| Resin | 100 | 100 | 100 | 100 | 100 | 100 |
| Cobalt III Acetylacetonate | -- | 0.15 | .075 | 0.0375 | 0.019 | -- |
| 6% Cobalt naphthenate | -- | -- | -- | -- | -- | 0.2 |
| Gram equivalents cobalt | -- | 0.0248 | 0.0124 | 0.0062 | 0.0031 | 0.012 |
| t-butylperbenzoate | 1.0 | 1.0 | 1.0 | 1.0 | 1.0 | 1.0 |

SPI Block Exotherm Data – 300°F

| | | | | | | |
|---|---|---|---|---|---|---|
| Gel Time (min.) | 1.59 | 0.89 | 1.06 | 1.19 | 1.24 | |
| Cure Time (min.) | 1.95 | 1.29 | 1.39 | 1.56 | 1.62 | |
| Peak Exotherm (°F) | 397° | 411° | 427° | 402° | 405° | |
| Kick-off Temp. (°F) | 268° | 238° | 252° | 247° | 254° | |
| Acceleration % | -- | 33.8 | 28.7 | 20 | 16.9 | 0.59 |

Accelerated Aging – 100°F Shelf Life

| | | | | | | |
|---|---|---|---|---|---|---|
| Days | 13-14 | 8-11 | 8-11 | 12-13 | 13-14 | <2 |

TABLE 2

| | -1 | -2 | -3 | -4 | -5 |
|---|---|---|---|---|---|
| Resin | 100 | 100 | 100 | 100 | 100 |
| Cobaltic acetylacetonate | -- | 0.15 | -- | -- | -- |
| bis(3-acetylacetonato) (acetylacetonato) cobalt III | -- | -- | 0.18 | 0.046 | 0.19 |
| Gram equivalents cobalt | -- | 0.0248 | 0.0248 | 0.0062 | 0.0025 |
| t-butylperbenzoate | 1.0 | 1.0 | 1.0 | 1.0 | 1.0 |
| SPI Block Exotherm Data - 300°F | | | | | |
| Gel Time (min.) | 1.57 | 0.95 | 0.79 | 0.79 | 0.90 |
| Cure Time (min.) | 1.89 | 1.27 | 1.24 | 1.18 | 1.32 |
| Peak Exotherm (°F) | 407° | 396° | 374° | 386° | 425° |
| Kick-off Temp. (°F) | 263° | 255° | 253° | 241° | 247° |
| Acceleration % | -- | 32.8 | 34.3 | 37.5 | 30.1 |
| Accelerated Aging - 100°F Shelf Life | | | | | |
| Days | 14-15 | 8-9 | 7-8 | 9-10 | 10-12 |

The above results show that at a 0.006 gram equivalent cobalt level, the acceleration was slightly greater than the acceleration rate obtained using four times the amount of cobalt in the control. The shelf life is approximately the same.

TABLE 3

|  | -1 | -2 | -3 | -4 | -5 |
|---|---|---|---|---|---|
| Resin | 100 | 100 | 100 | 100 | 100 |
| Cobaltic acetylacetonate | -- | 0.15 | -- | -- | -- |
| tris(3-chloroacetylacetonato) cobalt (III) | -- | -- | 0.193 | 0.048 | 0.012 |
| Gram equivalent cobalt | -- | 0.0248 | 0.0248 | 0.0062 | 0.0016 |
| t-butylperbenzoate | 1.0 | 1.0 | 1.0 | 1.0 | 1.0 |
| SPI Block Exotherm Data – 300°F | | | | | |
| Gel Time (min.) | 1.42 | 0.82 | 0.20 | 0.57 | 1.04 |
| Cure Time (min.) | 1.69 | 1.13 | 0.45 | 0.82 | 1.29 |
| Peak Exotherm (°F) | 423° | 395° | 397° | 453° | 407° |
| Kick-off Temp. (°F) | 257° | 245° | 227° | 227° | 227° |
| Acceleration % | -- | 33.1 | 73.3 | 51.4 | 23.6 |
| Accelerated Aging – 100°F Shelf Life | | | | | |
| Days | 16-19 | 7-8 | 2-5 | 5-6 | 9-12 |

The above results show that the trichloro substituted cobalt III complex imparts substantial acceleration to achieve reduced cure time. It would be expected that the trichloro substituted composition would be more effective than the diacetyl substituted promoter in view of the fact that the trichloro group has a much greater electron withdrawing ability. Coupled with the increased acceleration is a slight loss of shelf life, but since these are measured under accelerated aging conditions, these shelf lives are acceptable. The primary factor in this example is that for a 30% acceleration, the level of cobalt at the low end is about 1/16th that of the control. Another factor is that the kick-off temperature remained extremely high based on the control temperature as compared to the cobaltous type compositions, e.g. cobalt naphthenate which reduces the kick-off temperature substantially, e.g. in the neighborhood of 80 to 100°F.

TABLE 4

| | -1 | -2 | -3 | -4 | -5 | -6 |
|---|---|---|---|---|---|---|
| Resin | 100 | 100 | 100 | 100 | 100 | 100 |
| Cobalt III acetylacetonate | -- | 0.15 | -- | -- | -- | -- |
| bis(3-formylacetylacetonato)(acetylacetonato) cobalt (III) | -- | -- | 0.174 | 0.087 | 0.044 | 0.017 |
| Gram equivalents cobalt | -- | 0.0248 | 0.0248 | 0.0124 | 0.0062 | 0.0025 |
| t-butylperbenzoate | 1.0 | 1.0 | 1.0 | 1.0 | 1.0 | 1.0 |

SPI Block Exotherm Data – 300°F

| | -1 | -2 | -3 | -4 | -5 | -6 |
|---|---|---|---|---|---|---|
| Gel Time (min.) | 1.52 | 0.93 | 0.89 | 0.74 | 0.88 | 1.09 |
| Cure Time (min.) | 1.85 | 1.29 | 1.21 | 1.07 | 1.14 | 1.46 |
| Peak Exotherm (°F) | 405° | 412° | 397° | 412° | 399° | 407° |
| Kick-off Temp. (°F) | 278° | 250° | 242° | 247° | 236° | 256° |
| Acceleration % | -- | 30.2 | 34.5 | 42.1 | 38.3 | 21.0 |

Accelerated Aging – 100°F Shelf Life

| | -1 | -2 | -3 | -4 | -5 | -6 |
|---|---|---|---|---|---|---|
| Days | 13-14 | 9-10 | 2-3 | 2-3 | 3-4 | 6-7 |

The above results show that both a high kick-off temperature and rapid acceleration are noted at substantially reduced cobalt levels compared to cobaltic acetylacetonate control.

TABLE 5

| | -1 | -2 | -3 | -4 | -5 | -6 |
|---|---|---|---|---|---|---|
| Resin | 100 | 100 | 100 | 100 | 100 | 100 |
| Cobalt III acetylacetonate | - | 0.15 | - | - | - | - |
| tris(3-phenylacetylacetonato) cobalt (III) | - | - | 0.241 | 0.060 | 0.030 | 0.015 |
| Gram equivalent cobalt | - | 0.0248 | 0.0248 | 0.0062 | 0.031 | 0.0016 |
| t-butylperbenzoate | 1.0 | 1.0 | 1.0 | 1.0 | 1.0 | - |

SPI Block Exotherm Data – 300°F

| | -1 | -2 | -3 | -4 | -5 | -6 |
|---|---|---|---|---|---|---|
| Gel Time (min.) | 1.55 | 0.95 | 0.61 | 0.79 | 0.93 | 1.12 |
| Cure Time (min.) | 1.92 | 1.34 | 0.94 | 1.10 | 1.18 | 1.46 |
| Peak Exotherm (°F) | 402° | 405° | 404° | 417° | 421° | 403° |
| Kick-off Temp. (°F) | 264° | 250° | 219° | 230° | 235° | 246° |
| Acceleration % | - | 30.2 | 51.0 | 42.7 | 38.5 | 23.9 |

Accelerated Aging – 100°F Shelf Life

| | -1 | -2 | -3 | -4 | -5 | -6 |
|---|---|---|---|---|---|---|
| Days | 13-14 | 7-8 | 4-7 | 7-8 | 10-11 | 11-14 |

The results obtained are similar to the other substituted electron withdrawing agents as a 38% acceleration rate was obtained with about 1/10th the cobalt level used with cobaltic-acetylacetonate.